United States Patent [19]

Baggerly

[11] 3,955,000

[45] May 4, 1976

[54] CEREAL PROCESS AND PRODUCT

[75] Inventor: Patricia A. Baggerly, Battle Creek, Mich.

[73] Assignee: General Foods Corporation, White Plains, N.Y.

[22] Filed: Sept. 23, 1974

[21] Appl. No.: 508,299

[52] U.S. Cl. .............................. 426/96; 426/103; 426/621; 426/548
[51] Int. Cl.² ................... A23L 1/164; A23L 1/236
[58] Field of Search .......... 426/215, 217, 380, 103, 426/96, 548, 302, 619, 620, 621

[56] References Cited
UNITED STATES PATENTS

| | | | |
|---|---|---|---|
| 901,455 | 10/1908 | Lauhoff | 426/103 X |
| 3,642,491 | 2/1972 | Schlatter | 426/217 X |
| 3,753,739 | 8/1973 | Cella et al. | 426/217 X |
| 3,761,288 | 9/1973 | Glicksman et al. | 426/380 |

*Primary Examiner*—A. Louis Monacell
*Assistant Examiner*—Esther L. Massung
*Attorney, Agent, or Firm*—Bruno P. Struzzi; Thomas V. Sullivan; Michael J. Quillinan

[57] ABSTRACT

L-aspartic acid derivative sweetening compounds are admixed in aqueous suspension with hydrolyzed amylaceous derivatives comprising predominantly oligosaccharides solids having a low dextrose equivalency and applied as a coating solution to a cereal-base comestible whereby localized "hot-spots" are ameliorated and the product has a smooth sweetness, the derivative being uniformly distributed throughout the coating and a portion thereof being present as undissolved crystals.

11 Claims, No Drawings

CEREAL PROCESS AND PRODUCT

BACKGROUND OF THE INVENTION

It frequently is desirable to sweeten a cereal product with an artificial sweetener; the more popular current class of so-called artificial sweetener is the L-aspartic acid sweetening derivatives typical of which is the dipeptide L-aspartyl L-phenylalanine methyl ester (APM). Such esters, their salts and like derivatives have a sweetness estimated by some with the power one hundred fifty times that of a like weight of sucrose. Application of such sweeteners to a cereal base, say a ready-to-eat breakfast cereal product, such as a gun puffed product or a flake, can be occasioned by a rather non-uniform sweetening response; pinpoint "hot spots" of burning sensation in the oral regions of the tongue and mouth generally are detected; this is attributable to high concentrations in discrete locations on the comistible. The low solubility of such derivatives as APM (1% in water at room temperature) appears to contribute to the incomplete solution of such dipeptide sweeteners such that any topical application thereof to the surface of a foodstuff is accompanied by non-uniformity. A more soluble salt such as APM hydrochloride does enhance solubility properties in water but nevertheless leaves much to be desired in affording a topical application to foodstuff which is uniform insofar as a sweet-tasting response generated when product is consumed with such a sweetener as a coating.

STATEMENT OF THE INVENTION

In accordance with this invention, sweet tasting dipeptides and like L-aspartic derivatives in the group of which methyl ester of L-aspartyl L-phenylalanine (APM) is a preferred member noted hereinafter in the classification marked L-aspartic acid derivatives, are combined with a starch hydrolyzate recovered as by the acid or enzymatic hydrolysis of an amylaceous substance typically having a low dextrose equivalency and providing oligosaccharides of elemental monosaccharides, di- and tri-, tetra-, penta- and hexasaccharide which may have a varying dextrose equivalency but commonly would have a D.E. less than 30. A coating of a dried solution of such an hydrolyzate of cereal solids having a fine dispersion of the L-aspartic acid derivative has been found to smooth out the taste impact generated by any sweetening imbalance attributable to the incomplete solution of the APM or nonuniformity of its dispersion. Such a solution when applied to a cereal base such as corn flakes, puffed cereal products, baked goods such as pastry mixes and a variety of confectionary foodstuffs intended to be sweetened with the sensation of sucrose will provide a uniform distribution of sweetness such that when eaten the foodstuff has minimized localized physiological response identified as "hot spots"; the starch hydrolyzate contributes significantly to smoothing out the sweetness sensation.

DETAILED DESCRIPTION OF THE INVENTION

The dextrin "solution", so-called because the oligosaccharides are not completely dissolved but practically speaking are substantially dissolved or colloidally dispersed so as to have the gross appearance of a solution, has the L-aspartic acid derivative compound uniformly dispersed throughout. It will be practical to increase the temperature of the aqueous medium serving as a solvent for the dextrinous material and facilitate mixing to a uniform degree preparatory to having the sweetening compound dispersed therein. Homogenization or other means to finely disperse the derivative throughout the solution is preferably employed to assure a uniform dispersion and permit application of the coating solution by atomization or other spray techniques known to skilled art workers. In some applications it may be practical to wet mill the L-aspartic acid derivative in the dextrin solution to assure a substantially discrete form of finely suspended particles.

Generally, the coating solution will be maintained at a temperature below 200°F and preferably below 170°F during its preparation and application to the dry comestible, said temperature being low enough to have the sweetening derivative dispersed therein as undissolved hydrated particles. The coated comestible also will be dried at product temperatures that do not exceed 200°F in order to assure that the sweetening compound is not degraded while the coated comestible is dried to a stable moisture, say below 8% and more commonly below 6%.

The L-aspartic acid derivatives, when used at a sweetening power equivalent to that of a sucrose application for which it is substituted in the coating solution, is present in sufficient quantity to exceed the solubility of the sweetening compound; thus, the sweetening derivative is present in both the form of a solution solute and a very fine dispersion. Although the dextrinous saccharides are not as sweet per se and generally contribute little noticeable sweetness, they do appear to balance the foodstuff to which they are applied as a solution and on which they are dried as a coating.

However, it is not intended to foreclose the use of sucrose and other mono- and polysaccharides in the coating solution to supplement the sweetness of a derivative or permit economic use in reduced amounts. Thus the so-called sweetening sugars may be employed at major sweetening levels or minor sweetening levels as desired.

The invention will now be described by reference to the accompanying operative example of a typical mode thereof.

9.65 grams of hydrolyzed cereal solids (MOR-REX) having a dextrose equivalency of 10–13 and composed of the following assay of carbohydrates on a dry basis are used to prepare a solution by addition to 14 grams of water at 110°F and 1.08 grams of APM.

MOR-REX ANALYSIS

| D.E. | 10–13 |
|---|---|
| pH | 4.5–5.5 |
| Carbohydrate, % d.b. | |
| Dextrose | 1 |
| Di-Saccharide | 4 |
| Tri-Saccharide | 5 |
| Tetra-Saccharide | 4 |
| Penta-Saccharide | 4 |
| Hexa-Saccharide and above | 82 |

Preferably the dextrin solution is prepared by stirring the warm solution to eliminate any lumps and facilitate mixing and insure solution of the dextrin; the APM is added to the dextrin solution and uniformly mixed and homogenized in a bench-top homogenizer to create a uniform suspension of the APM particles which is allowed to cool to ambient room temperature, say 72°F. The solution is ready for spray application.

The solution thus produced can be sprayed on 444.5 grams of corn flakes and then dried at air temperature of 180°F for twenty-five minutes until a moisture content of approximately 2.5% is obtained. Homogenizing the mixture in water produces a very discrete finite dispersion of the APM such as would permit application thereof as a fine slurry onto the corn flakes by atomization, 24 grams of the coating being employed to uniformly coat all of the cereal flakes as aforesaid resulting in a coating of sweetening of about 0.24% by weight.

The coated cereal system had a sweetness quite comparable to that of sucrose-coated corn flakes and advantageously did not have the overly frosted appearance that many comsumers associate with an undesirable or excessive amount of sucrose; the product when tested, in packaging, will be found to be stable over a period of at least 3 months storage when tested under accelerated packaging conditions of high and low relative humidity thought to be representative of climes in the continental states of this country.

Although the invention has been described by reference to a particular best mode for practicing same, it is not to be restricted to any particular embodiment since any in the wide range of sweetening materials in the class of L-aspartic acid derivatives may be employed and in view of the varying sweetness levels thereof, and the organoleptic variations for preference, that may be found with varying foodstuffs, it is meaningless to attempt to assert criticalities. It suffices to say that the dextrinous cereal hydrolyzate is employed at least at a weight proportion greater than that of the L-aspartic acid derivative sweetening compound per se and indeed the sweetening compound customarily will be employed at less than 36% by weight of the starch hydrolyzate coating solids commonly in the neighborhood of 4% to 18% selected for the sake of definiteness only but not intended to be limiting in the present context.

The level of the use of the starch hydrolyzate itself will be dictated more by the intended appearance of the coating on the flake or more comestible rather than its functionality as such; thus, for some breakfast cereal applications, it may be desirable to use a larger amount of the hydrolyzate for purposes of achieving a gloss simulating the gloss of a sugar-sweetened cereal product having a low level of reducing saccharides therein and highly suggestive therefore of a non-crystallized sugar coating. On the other hand, other applications may call for the incorporation of substances such as fats, starches, and such which are operative to create a dull or crystalline appearance suggestive of other sweetened cereal applications ranging from a fondant frosting or topping appearance to a thin light crystallization synonymous with a surface sanding which is common to many current ready-to-eat breakfast cereal applications. It will be understood therefore, that the upper level of use of starch hydrolyzate is not a limiting factor and enough must be employed to achieve the intended functional benefits ascribed to it hereinabove, that is, the smoothing of the organoleptic contributions of the L-aspartic acid derivative per se.

The L-aspartic acid derivatives thought to be of use in accordance with this invention as appendixed are:

1. The methyl esters of L-aspartyl-2,5-Dihydro-L-phenylalanine; L-aspartyl-L-(1-cyclohex-1-en)-alanine; L-aspartyl-L-phenyl-glycine; L-aspartyl; L-2,5-dihydro-phenylglycine;

2. methyl-L-aspartyl-L-alpha phenylglycinase and its salts;

3. Lower alkyl esters of L-aspartyl-L, (Betacyclohexyl) alanine;

4. Those alkyl esters classed as alpha-L or DL-aspartyl-L or DL-substituted glycine described in Netherlands Pat. No. 7,007,176 issued May 19, 1974 preparation of aspartyl compounds and issued to Stamicarbon, NV.;

5. Those hydrogenated dipeptide ester sweeteners such as L-asparagio-O-etherfied serine methyl esters described in French Patent No. 2,105,896 issued April 28, 1972 for Dipeptide Ester Sweeteners to Takeda Chemical Industries Ltd.;

6. Those aspartic acid peptide esters having claiming the formula:

where R and $R_1$ are $CH_3$ or $C_2H_5$ and $R_2$ is 4–7C alkyl having the stereo chemical form L-L, DL-L, L-DL, or DL-DL:

7. Those sweetening agents having the compound:

shown in British Patent 1,339,101 issued Nov. 28, 1973 to Searle and Co., G. D. wherein R is a lower alkyl such as methyl and is prepared by reacting an N-protected-L-aspartic anhydride with L-phenylalanine lower alkyl esters, and 8. Those sweetening preparations having the formula L-aspartyl-L-1,4-dimethyl-pentyl amide disclosed in German Patent No. 2,306,909 issued Aug. 23, 1973 to Proctor and Gamble.

While the invention has been described by reference to a detailed discription interpretation thereof should be had to the accompanying claims for understanding thereof, particularly in view of the wide latitude of L-aspartic acid derivatives appendixed.

What is claimed is:

1. An artificially sweetened dry comestible comprising a hydrolyzed amylaceous dextrinous solids coating having an L-aspartic acid sweetening derivative uniformly and finely dispersed throughout the coating, said coating being uniformly distributed on the surface of the dry comestible.

2. A comestible according to claim 1 wherein the derivative is present at a minor weight of the coating solids, at least a portion of the derivative being discretely distributed as undissolved crystals throughout the coating.

3. A comestible according to claim 1 wherein the derivative is present at a level of 2 to 36% by weight of the coating solids.

4. A comestible according to claim 1 wherein the solids in said coating are predominantly an oligosaccharide mixture.

5. A comestible according to claim 4 wherein the derivative is present at a level of 2 to 36% of the hydrolyzate coating solids.

6. A comestible according to claim 1 wherein the derivative is a lower alkyl ester of L-aspartyl-L-phenylalanine.

7. A process for coating a dry comestible which comprises causing a slurry-forming level of undissolved particles of a sweet L-aspartic acid derivative compound to be dispersed in an aqueous solution of hydrolyzed amylaceous dextrin coating solids, applying the resultant slurry onto the comestible, and drying said coating on the comestible.

8. The process of claim 7 wherein the dextrin coating solids are present at a weight greater than the sweetening derivative.

9. The process of claim 8 wherein the coating solution is applied at a temperature below 200°F.

10. The process of claim 9 wherein the derivative is applied at a level of 2 to 36% of the dextrin coating solids.

11. The process of claim 10 wherein the derivative is a lower alkyl ester of L-aspartyl L-phenylalanine.

* * * * *